(12) United States Patent
Fails

(10) Patent No.: US 6,712,086 B1
(45) Date of Patent: Mar. 30, 2004

(54) ABOVE GROUND METER BOX

(76) Inventor: Sidney T. Fails, Rte. 1 Box 218, Bassfield, MS (US) 39421

( * ) Notice: Subject to any disclaimer, the term of this patent is extended or adjusted under 35 U.S.C. 154(b) by 0 days.

(21) Appl. No.: 10/323,726

(22) Filed: Dec. 20, 2002

(51) Int. Cl.$^7$ .............................. F16K 27/12; B08B 3/00
(52) U.S. Cl. .............................. 137/15.03; 137/315.06; 137/364; 137/371; 137/373
(58) Field of Search .................. 137/364, 373, 137/375, 371, 15.03, 315.06

(56) References Cited

U.S. PATENT DOCUMENTS

| | | | |
|---|---|---|---|
| 1,057,289 A | | 3/1913 | Sieber |
| 1,236,265 A | | 8/1917 | Casson |
| 1,281,332 A | | 10/1918 | Ford |
| 1,600,761 A | | 9/1926 | Haase |
| 1,832,852 A | | 11/1931 | Bassett |
| 1,857,331 A | | 5/1932 | Reid |
| RE21,470 E | * | 5/1940 | White .............................. 62/1 |
| 2,217,583 A | * | 10/1940 | White .............................. 62/1 |
| 2,724,968 A | | 11/1955 | Greene ......................... 73/201 |
| 3,111,030 A | | 11/1963 | Whitman ..................... 73/201 |
| 3,717,963 A | | 2/1973 | Sauriol .......................... 52/19 |
| 3,913,400 A | | 10/1975 | Floren ......................... 73/273 |
| 3,921,449 A | | 11/1975 | Hauffe et al. ................. 73/273 |
| 3,935,736 A | | 2/1976 | Enright ........................ 73/201 |
| 3,961,528 A | * | 6/1976 | Ford .......................... 137/364 |
| 4,133,021 A | | 1/1979 | King et al. ................... 361/365 |
| 4,163,503 A | | 8/1979 | McKinnon ................... 220/18 |
| 4,305,282 A | | 12/1981 | Hunt ........................... 73/201 |
| 4,310,015 A | | 1/1982 | Stewart et al. ............... 137/364 |
| 4,331,178 A | | 5/1982 | Handley et al. ............. 137/556 |
| 4,515,437 A | | 5/1985 | Story ........................... 350/114 |
| 4,643,523 A | | 2/1987 | Smedley et al. ............. 350/319 |
| 4,819,482 A | | 4/1989 | Rappart et al. ................ 73/201 |
| 5,167,470 A | * | 12/1992 | Bertolozzi et al. ............ 405/52 |
| 5,251,473 A | * | 10/1993 | Reese .......................... 73/49.2 |
| 5,303,583 A | | 4/1994 | Harris ......................... 73/201 |
| 5,747,687 A | | 5/1998 | Edwards et al. ............. 73/277 |
| 5,996,612 A | | 12/1999 | Crawford .................... 137/371 |
| 6,164,131 A | | 12/2000 | Edwards et al. ............. 73/277 |

FOREIGN PATENT DOCUMENTS

EP          0 718 606          6/1996

* cited by examiner

*Primary Examiner*—A. Michael Chambers
(74) *Attorney, Agent, or Firm*—Richard C. Litman

(57) ABSTRACT

An above ground meter box comprising a housing, a removable housing cap, openings on the housing, an adapter pipe, a meter, a annular ring and tubing. A below-ground annular ring is located on the bottom of the housing. A removable housing cap is attached to the top of the housing and covers the open top of the housing. A meter opening receives any brand of meter by placing a grommet on the meter to adapt the meter to conform with the size of the meter opening. At least two openings are located on the housing bottom, adapted to receive the adapter pipe and the tubing connected to the existing consumer line. A faucet may be added to the meter assembly to provide a means to test water pressure, for testing back flush meters, to test for nonfunctioning meters, and for a water sample point.

16 Claims, 4 Drawing Sheets

ABOVE GROUND METER BOX

BACKGROUND OF THE INVENTION

1. Field of the Invention

The present invention relates to meter boxes and, more particularly, to above ground meter boxes with openings for reading and repairing the meter housed in the meter box.

2. Description of the Related Art

Meters and accessories are commonly installed where services such as gas, electricity or water are supplied to a building. The meters are commonly located in cases to protect them from weather and tampering. The meters are sometimes located inside of buildings or beneath them. Meters may also be located in exterior meter boxes. Exterior meter boxes are most commonly located below the ground surface.

There are many disadvantages to having meters located below the ground surface. When an underground water meter leaks the leakage simply penetrates the ground and goes undetected. Also, it is extremely difficult and time consuming to install, repair and replace water meters that are located underground. Above ground meters also increase the safety of the workers reading and repairing the meters because it decreases the chances of being bitten by snakes or insects. Above ground meters are also more efficient because it is easier and less time consuming to read the above ground meters.

Certain examples of meter boxes that are representative of common meter boxes are disclosed in the following patents. U.S. Pat. No. 6,164,131 to Edwards et al. describes a common underground meter box assembly. The meter box assembly provides an openable closure, located at ground level, permitting inspection of and access to the meter.

U.S. Pat. No. 4,515,437 to Story discloses an apparatus for reading water meters that are located beneath the ground. The apparatus provides a center tube assembly with a light guide. In operation the center tube assembly is aligned over the meter face which is then viewed through the center tube.

U.S. Pat. No. 4,643,523 to Smedley et al. discloses a telescoping water meter reading apparatus. The apparatus includes a telescopic tubular viewer attached to the undercount meter and provides a clear sight path through water in the meter box for easy meter reading.

U.S. Pat. No. 2,724,968 to Greene discusses an above ground housing for meters. The invention provides a sectional housing with a base section and upwardly convergent walls. Greene further provides an opening to accommodate or pass elements such as pipes. This opening facilitates installation of the meter.

U.S. Pat. No. 1,832,852 to Bassett describes an above ground meter cabinet. The meter cabinet provides a housing for protecting the meter. The cabinet further provides an opening for the water meter to facilitate reading of the meter. The face of the meter is covered with glass to prevent rain and dirt from getting on the dial face of the meter.

U.S. Pat. No. 3,111,030 to Whitman discloses an exterior meter housing. The housing covers the exterior meter for protection. A transparent window is formed in one side of the housing for reading the meter. The meter housing is of attractive appearance so it may be used in conjunction with house or yard accessories.

U.S. Pat. No. 4,133,021 to King et al. discusses a multiple utility pedestal. The utility pedestal is an above ground meter housing. Partitions inside of the pedestal separate the interior into a series of user-accessible compartments containing valves and connections, and separate locked compartments which contain metering devices that are accessible to the appropriate utility company.

A problem exists with these meter boxes in that they do not provide an easily accessible means for installing, reading and maintaining above ground meters. Certain existing meters provide i means for above ground reading of meters but they do not provide an easily accessible means for installing and repairing the meters as well.

Therefore, what is needed is an above ground meter box that provides easy and efficient reading of the enclosed meters. What is further needed is an above ground meter box that provides an easily accessible means for installing, repairing and replacing the meters enclosed in the meter box. What is further needed is a meter box that is adapted to receive any commonly used brand of meter. What is still further needed is an above ground meter box that provides an increased degree of safety to the persons having access to the meters. Finally, what is further needed is an above ground meter box that is designed to provide a greater degree of physical stability.

None of the above inventions and patents, taken either singularly or in combination, is seen to describe the instant invention as claimed. Thus a above ground meter box solving the aforementioned problems is desired.

SUMMARY OF THE INVENTION

The invention is an above ground meter box meeting some or all of the industry needs mentioned above. The present above ground meter box provides efficient reading of meters and an easy means of installation, removal and repair of meters.

Preferred embodiments of the present invention comprise a housing, a removably attached housing cap, a plurality of openings on the outer surface of the housing, an adapter pipe, a meter, an annular ring and tubing. The preferred embodiments can be adapted to use any brand of commonly used meter. The present above ground meter box can be used with any fluid meter.

In accordance with one aspect of the present invention the housing comprises upwardly convergent exterior walls. Because the housing is tapered in this manner, it provides a greater degree of stability. The tapered structure also allows for stacking of the above ground meter boxes for easier shipping. To further improve the stability of the above ground meter box, an annular ring is located on the bottom of the housing. The annular ring is slightly wider than the rest of the housing to improve stability. The annular ring is located beneath the ground and the bottom portion of the housing is packed in the ground to hold the above ground meter box in place.

The housing further comprises an open top to provide access to the meter for installation, removal and repairs. To protect the contents of the above ground meter box a removable housing cap is attached to the top of the housing and covers the open top of the housing. The housing cap can easily be removed whenever access to the meter is necessary.

According to one aspect of the present invention a plurality of openings are located on the outer surface of the housing. One of these openings is adapted to receive a meter. The meter opening may receive any brand of meter by placing a grommet on the meter to adapt the meter to conform with the size of the meter opening. The grommet secures the meter in place in the meter opening. At least two openings are located on the bottom of the housing. These openings are adapted to receive the adapter pipe and the tubing connected to the existing consumer line.

In accordance with one aspect of the present invention the adapter pipe is connected at a first end to an existing curb stop. The adapter pipe is then connected at a second end to a meter valve. The meter valve functions to turn on and off the flow of water. The meter valve is then connected to the meter using a meter nut. The meter is connected to the tubing using a meter nipple with a tubing adapter at one end. The tubing adapter allows the meter nipple to be attached to any type of tubing. The tubing is then connected to the existing consumer line using appropriate fittings. Different fittings will be used depending of the type of pipe the existing line is made from.

The inlet flow of water must flow from the top of the meter to the bottom of the meter. This allows for the meter numbers to be seen upright when read through the meter opening. The inlet flows from the existing curb stop through the adapter pipe to the meter valve. After passing through the meter valve and then through the meter the inlet flows through the tubing into the existing consumer line.

In certain preferred embodiments of the present invention a faucet is added to the meter assembly. The faucet provides a means to test the water pressure, to test for back flush meters, to test for nonfunctioning meters and to act as a water sample point. A faucet opening is located on the outer surface of the housing and is adapted for receiving a faucet. The faucet is connected between the meter nipple and the tubing adapter using a faucet tee.

In accordance with a method aspect of the present invention an above ground meter box is installed in place of an existing meter connection. The existing meter box and meter are removed. The existing curb stop is kept in its existing position below ground and an adapter pipe is attached to the curb stop. A meter valve is then attached to the other end of the adapter pipe. The meter valve is next attached to the meter. The meter is connected to the tubing by a meter nipple with a tubing adapter at one end. The tubing adapter allows the meter nipple to be connected to any type of tubing.

The tubing is connected to the existing consumer line using appropriate fittings. The housing is then placed over the meter assembly and filled with insulation. Finally, the removable housing cap is placed on top of the housing.

In accordance with another aspect of the present invention an above ground meter box is installed where there is no pre-existing meter connection. Because there is no pre-existing meter connection there is no need for an adapter pipe. The main water supply line is attached to a street ell valve. The street ell is screwed into the meter. The meter is then attached to the tubing in the same manner as above. The tubing then runs to the consumer.

In accordance with another method aspect of the present invention the meter is replaced in the above ground meter box by first removing the housing cap and closing the meter valve to stop the flow of water. Then all of the insulation above the meter is removed. The meter valve is loosened and moved to the side. The meter nuts are then loosened and the meter is removed. A new meter is installed and the meter valve is reconnected. Finally, the housing is refilled with insulation and the housing cap is replaced.

Accordingly, it is a principal object of the invention to provide an above ground meter box with an easy and efficient means of reading the enclosed meters.

It is another object of the invention to provide an above ground meter box with an easily accessible means for installing, repairing and replacing the meters enclosed in the meter box.

It is a further object of the invention to provide an above ground meter box that is adapted to receive any commonly used brand of meter.

Still another object of the invention is to provide an above ground meter box that provides an increased degree of safety to the persons having access to the meters.

Still another object of the invention is to provide an above ground meter box that is designed to provide a greater degree of physical stability.

It is an object of the invention to provide improved elements and arrangements thereof for the purposes described which is inexpensive, dependable and fully effective in accomplishing its intended purposes.

These and other objects of the present invention will become, readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
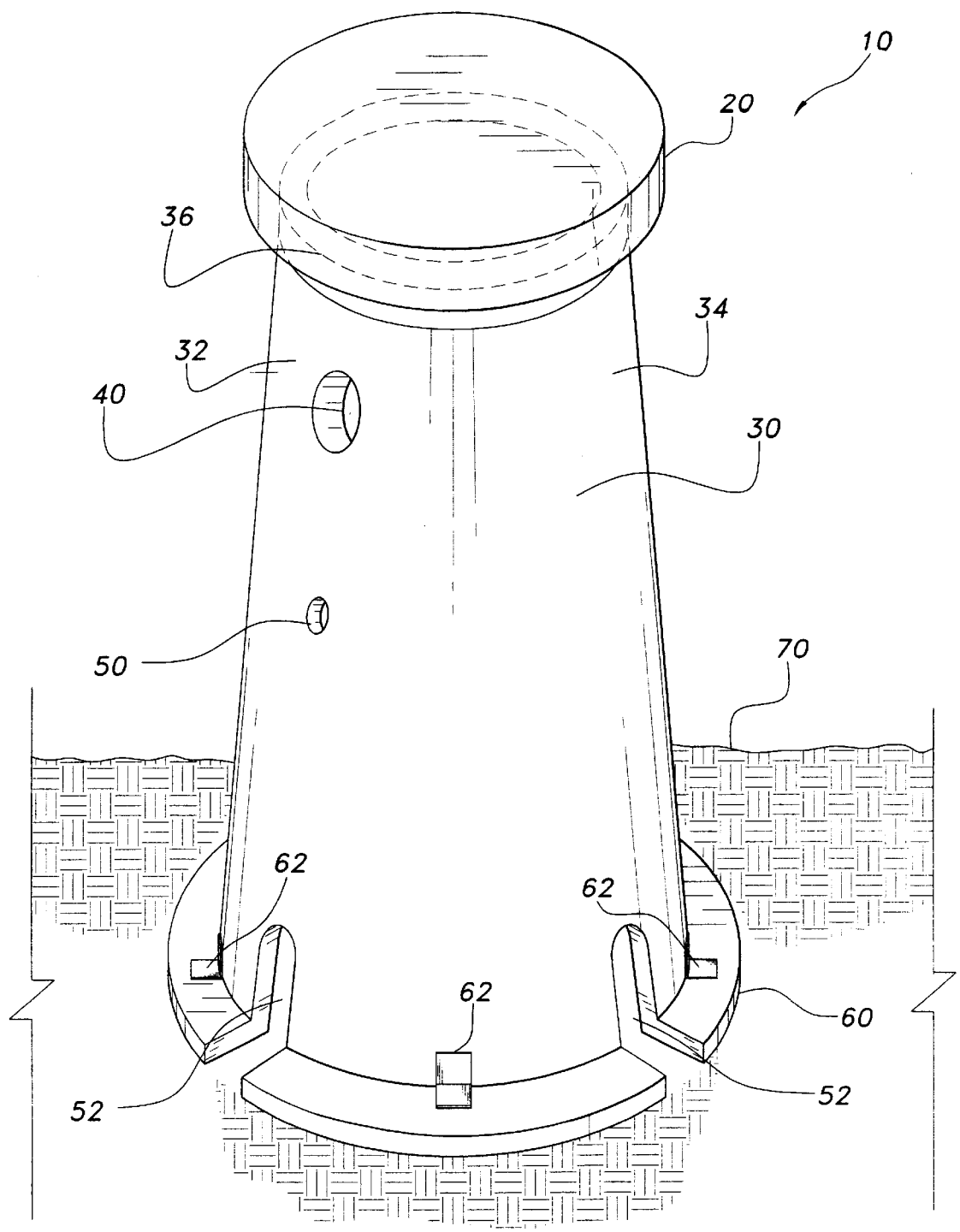
FIG. 1 is an environmental, perspective view of an above ground meter box according to the present invention.

FIG. 1 is an environmental, perspective view of an above ground meter box 10. The present above ground meter box 10 can be used with any fluid meter. Preferred embodiments of the above ground meter box 10 comprise a housing 30 with a housing cap 20 and an annular ring 60. The housing 30 comprises upwardly convergent exterior walls 32 and 34. The housing 30 in the preferred embodiments depicted in the Figures has a cylindrical shape. The housing is not limited to this shape and can be made any shape with upwardly converging exterior walls 32 and 34. The housing 30 further comprises an open top 36.

The open top 36 provides access to the above ground meter box 10 for installing, replacing or repairing its contents. In certain embodiments of the present above ground meter box 10 a portion of the back wall of the housing 30 may be removed for additional access to the meter 130. After removing the housing cap 20, the top third (the portion of the housing 30 above the meter 130) of the back wall of the housing can be removed to provide additional access to the meter 130.

The tapered structure of the housing, provided by the upwardly convergent exterior walls 32 and 34, increases the stability of the above ground meter box 10. The annular ring 60 is provided to further increase the stability of the above ground meter box 10.

The annular ring 60 is located at the bottom of the housing 30. The annular ring 60, as depicted in FIG. 1, is slightly wider than the housing 30. The annular ring 60 forms a lip that extends out from the bottom of the housing 30. For additional support, a plurality of base support members 62 secure the annular ring 60 to the housing 30. The annular ring 60 is located beneath the surface of the ground 70 and the bottom portion of the housing 30 is packed into the ground with dirt to secure the above ground meter box 10 in place.

Figure 2:
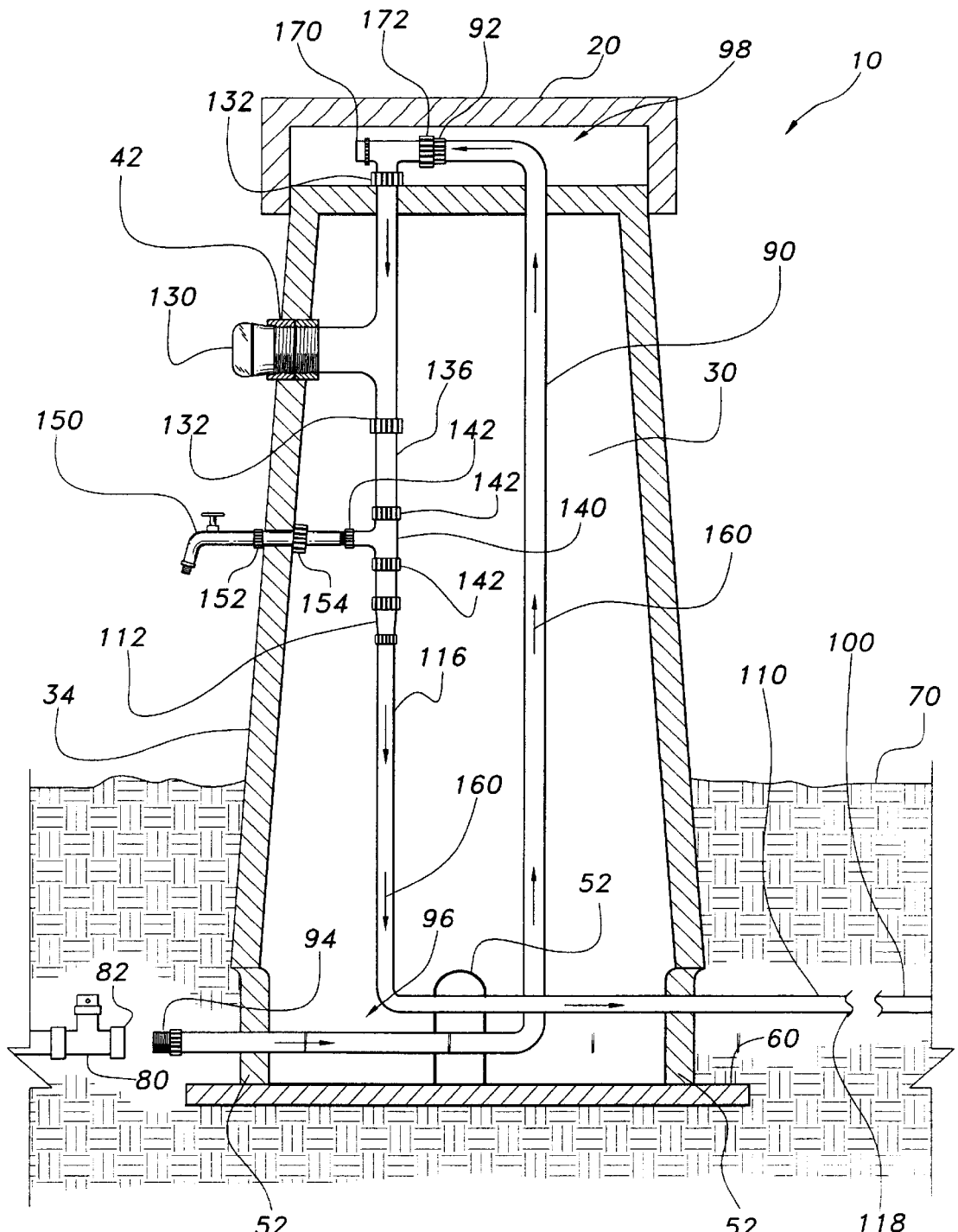
FIG. 2 is an interior view of the preferred embodiment of the above ground meter box depicted in FIG. 1.

A plurality of openings are located through the walls of the housing 30. The meter opening 40 is adapted for receiving a meter 130, which is shown in FIG. 2. The meter opening 40 is capable of receiving any brand of commonly used meter. The faucet opening 50 is an optional feature. If a faucet 150, which is depicted in FIG. 2, is included in the above ground meter box 10, then the faucet opening 50 will be located below the meter opening 40 for receiving the faucet 150. Finally, at least two pipe openings 52 are located at the bottom of the housing 30. The pipe openings 52 are adapted to receive an adapter pipe 90 and tubing 110, which are both depicted in FIG. 2. In preferred embodiments of the present invention there are four pipe openings 52 located on the housing 30.

The housing cap 20 covers the open top 36 of the housing 30. The housing cap 20 protects the contents of the above ground meter box 10 from dirt, weather and tampering. The housing cap 20 is placed over the open top 36 and fits into place around the housing 30. The housing 30 and the housing cap 20 can be made out of any type of UV protecting plastic. The use of structured form, nitrogen insulated plastic or other thermal insulating plastic will aid in freeze protection.

FIG. 2 is an interior view of the preferred embodiment of the above ground meter box 10 depicted in FIG. 1. The contents of the above ground meter box 10 comprise an adapter pipe 90, a meter valve 170, a meter 130, a grommet 42, a meter nipple 136, a tubing adapter 112 and tubing 110. Also, an optional faucet 150 is provided in certain preferred embodiments.

Figure 3:
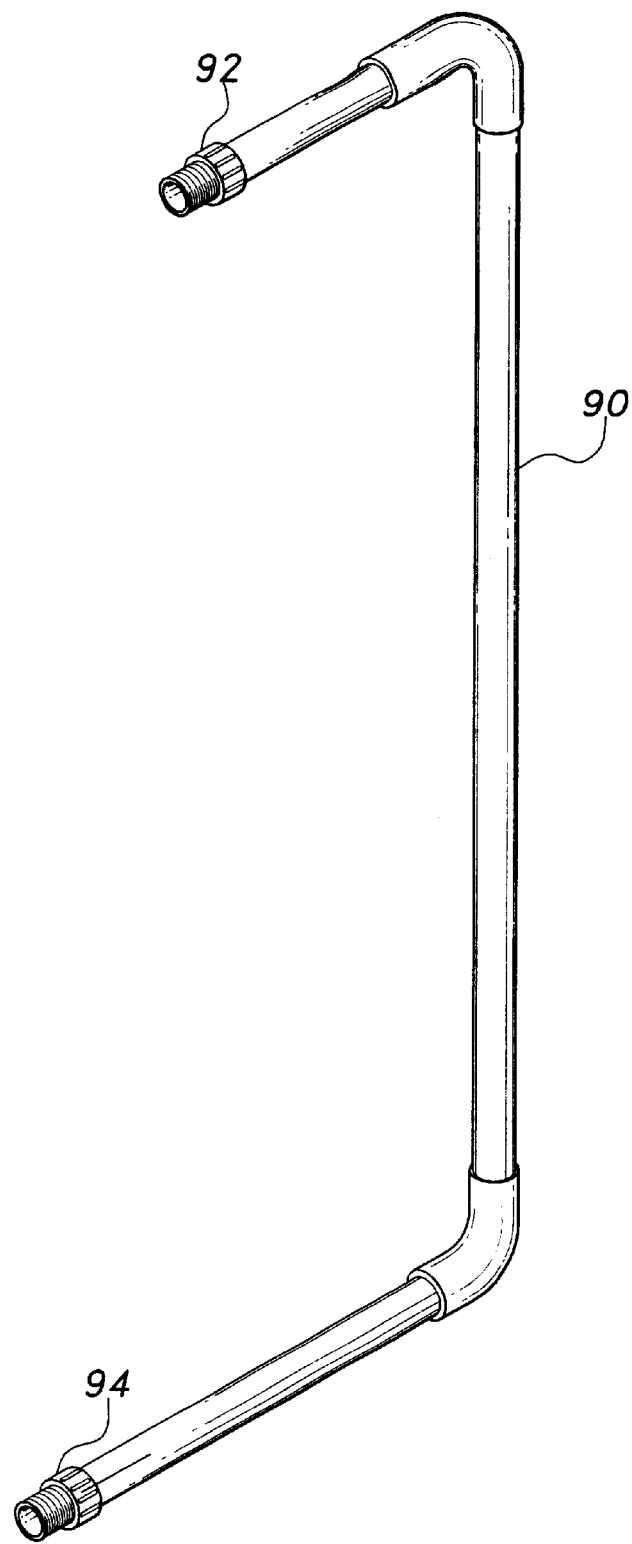
FIG. 3 is an environmental, perspective view of an adapter pipe.

The adapter 90 functions to adapt an existing meter connection to the new above ground meter box 10. The adapter pipe 90 is made from any suitable material including, but not limited to, copper, polyethylene, brass and PVC. FIG. 3 shows an enlarged view of the adapter pipe 90. The adapter pipe 90 had threaded ends 92 and 94. Threaded end 94 is adapted for attaching the adapter pipe 90 to an existing curb stop 80. Curb stop 80 is equipped with a curb stop fastener 82. Depending on the type of curb 80 in place, the threaded end 94 will be adjusted to fit the existing curb stop fastener 82. The threaded end 92 is adapted to attach the adapter pipe 90 to a meter valve 170. The threaded end 92 is secured to the meter valve 170 by a meter valve nut 172.

The adapter pipe 90 allows for water to flow from the existing curb stop 80 to the meter 130. The existing curb stop 80 is located beneath the surface of the ground 70. Once the adapter pipe 90 is attached to the curb stop 80 it enters the housing 30 through one of the pipe openings 52.

The meter valve 170 opens and closes the flow of water to the meter 130. Because the curb stop 80 is located beneath the surface of the ground 70 it is difficult to access to shut off the water supply. The location of the meter valve 170 provides an accessible means of closing the flow of water during installation, replacement or repair of the meter 130. To close the flow of water the housing cap 20 is removed and the meter valve 170 is turned to a closed position. The location of the meter valve 170 allows for easier locking out of the meter 130 and this lock out of water and soil extends the life of the meter valve 170 and meter 130.

The meter 130 is attached to the meter valve 170. The meter 130 is secured in the meter opening 40. The meter 130 can be read through the meter opening 40. This provides an efficient means for reading the meter 130 because the housing 30 does not need to be opened or removed to read the meter 130. Also, if the above ground meter box 10 is located near the street the meter 130 can be read while the reader remains in his vehicle. The meter opening 40 can receive any brand of commonly used meter 130.

To ensure that any meter 130 can fit the meter opening 40 a grommet 42 is used to secure the meter 130 in the meter opening 40. The grommet 42 is specifically designed for each type of meter 130 and adapts the meter 130 to fit securely in the meter opening 40. In certain preferred embodiments the grommet 42 may include a rain shield. The rain shield would project out from the top of the grommet and hang over the outer face of the meter 130. The rain shield would protect the face of the meter 130 from any falling rain or debris.

The meter 130 is attached at one end to the meter valve 170 using a meter nut 132. At the other end the meter 130 is attached to a meter nipple 136 using a meter nut 132. The meter nipple 136 is an attachment means for connecting the meter 130 to the tubing 110.

In the preferred embodiment depicted in FIG. 2 an optional faucet 150 is provided. The faucet 150 extends through the exterior wall 34 of the housing 30 through the faucet opening 50. The faucet 150 provides a means for testing the meter 130 for leaks without having to remove the housing 30. The optional faucet 150 is attached to a faucet nipple 152. If the optional faucet 150 is not used, a cap may be placed on the faucet nipple 152 to seal the faucet opening 50. The faucet nipple 152 is attached to a faucet tee 140 using a fastener 142. The fastener 142 is any appropriate fastener but particularly a nut and washer. The faucet tee 140 is attached to the meter nipple 136 by a fastener 142. The faucet tee 140 is attached to a tubing adapter 112 at the other end by a fastener 142.

A rubber bushing 154 is slipped over the faucet nipple 152 between the faucet tee 140 and the wall of the housing 30. The rubber bushing 154 keeps the threads from bottoming out when installing a cap or a faucet 150. The rubber bushing also secures the piping and meter 130 in the box and seals the faucet opening 50.

The tubing 110 connects the meter 130 to the existing consumer line 100. The tubing 110 is made from any suitable material including, but not limited to, copper, polyethylene, brass and PVC. The tubing adapter 112 fits the tubing 110 to the meter nipple 136. The tubing adapter 112 can be any appropriate adapter and in preferred embodiments a compression adapter is used. The tubing 110 then passes through a pipe opening 52 and attaches to the existing consumer line 100. The tubing 110 and the existing consumer line 100 are secured together using appropriate fasteners. The fasteners used will vary depending on the type of pipe used in the existing consumer line 100.

The arrows 160 demonstrate the inlet flow through the meter assembly. The water flows from the curb stop to the adapter pipe 90 at the bottom end 96 of the adapter pipe 90. The water then flows to the meter valve 170 located at the top end 98 of the adapter pipe 90. After passing through the meter valve 170 and the meter 130, the water travels from the top portion 116 of the tubing 110 to the existing consumer line 100 at the bottom portion 118 of the tubing 110. It is important that the inlet flow from the top of the meter 130 to the bottom of the meter 130 so that the numbers in the meter 130 will be upright when read through the meter opening 40.

Figure 4:
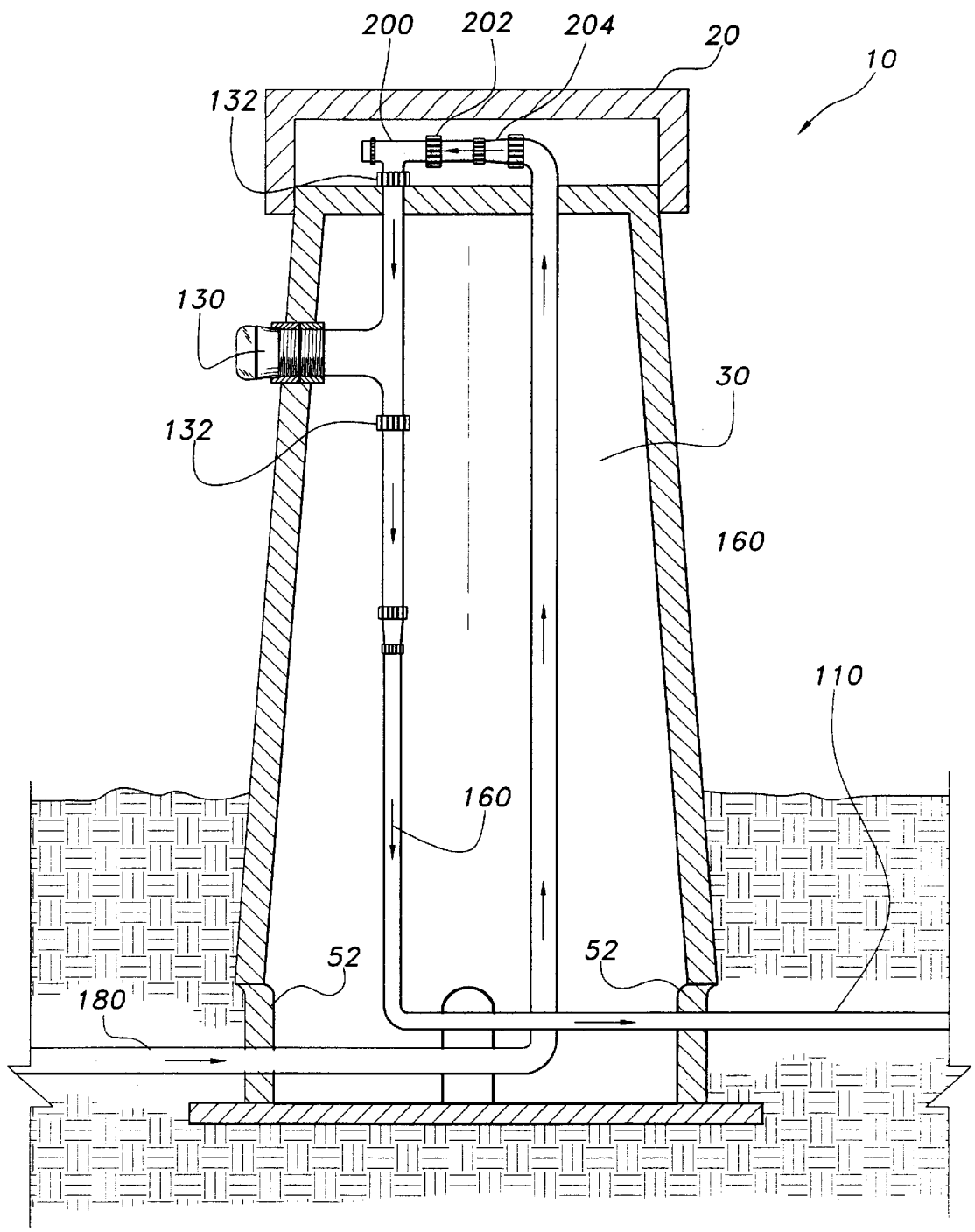
FIG. 4 is an interior view of another preferred embodiment of the above ground meter box depicted.

FIG. 4 is an interior view of an above ground meter box 10 according to another preferred embodiment of the present invention. In the present embodiment there is no preexisting meter connection. Because there is no preexisting connection there is no need for an adapter pipe 90 because there is no curb stop 80 beneath the surface of the ground 70. The supply line 180 enters the housing 30 through a pipe opening 52. The supply line 180 attaches to a street ell 200. The supply line 180 is fitted to the street ell 200 using a tubing adapter 204. The tubing adapter 204 is secured to the street ell 200 by a fastener 202. The fastener 202 can be any appropriate fastener known to those skilled in the art.

The street ell 200 controls the flow of water through the meter 130. The street ell 200 is attached to the meter 130 using a meter nut 132. The meter 130 is then attached to a meter nipple using a fastener 132. The meter nipple is attached to the tubing 110. The tubing 110 supplies the water to the consumer.

Use of the above ground meter box 10 allows the consumer to connect to the water service without having to disturb the above ground meter box. Also, the above ground meter box 10 can have a number printed on the outside of the housing 30 to assist in locating and indentifying the consumer's meter. Finally, the above ground meter box 10 allows for the meter 130 to be read at a distance.

When installing an above ground meter box 10 in place of an existing meter connection the first step is to remove the existing meter box and meter. The existing curb stop 80 remains in its below ground position. The adapter pipe 90 is then attached to the curb stop 80. The adapter pipe 90 and the adapter pipe threaded ends 92 and 94 are constructed based on the size of the meter 130 and the curb stop 80. The meter assembly is then assembled using the existing meter 130, the adapter pipe 90, the meter valve 170 and the tubing 110. When installing the existing meter 130, a grommet 42 is added to securely fit the existing meter 130 in the meter opening 40.

In preferred embodiments where a faucet 150 is used a faucet tee 140 is attached to the meter nipple 136 using a fastener 142. The tubing adapter 112 is then installed to the faucet tee 140 and the tubing 110 is run to the existing consumer line 100 using appropriate fittings. The curb stop 80 and the annular ring 60 of the housing 30 are buried beneath the surface of the ground 70 and dirt is packed around the bottom of the housing 30 to secure the housing 30 in place. The housing is then filled with insulation for freeze protection. Preferably the insulation is ZONOLITE, a free flowing vermiculite specifically treated for water repellency, but any appropriate insulation may be used, including but not limited to vermiculite and cellulose. Finally, foam rubber is placed in the housing cap 20 to protect the adapter pipe 90 and the meter valve 170 and the housing cap 20 is placed on top of the housing 30.

When replacing an existing meter connection with the above ground meter box 10, the housing 30 and all of the necessary components, except the insulation, may be pre-assembled.

When changing a meter 130 in an above ground meter box 10, the housing cap 20 must be removed from the top of the housing 30. Next the meter valve 170 must be turned to a closed position to stop the flow of water through the assembly. The insulation is then removed to below the meter 130. Then the meter valve 170 is loosened and moved to the side. Next the meter 130 is loosened and removed and a new meter 130 is installed in its place. The meter valve 170 is then reconnected and the housing 30 is refilled with insulation.

It is to be understood that the present invention is not limited to the embodiments described above, but encompasses any and all embodiments within the scope of the following claims.

I claim:

1. A method for installing an above ground meter box in place of an existing meter connection comprising the steps of:

removing existing meter box and meter;

leaving existing curb stop in below ground position;

attaching an adapter pipe to said existing curb stop and attaching a meter valve to the other end of said adapter pipe;

attaching said meter valve to said existing meter using a meter nut;

attaching a meter nipple to said meter on a first end and to a pressure adapter on a second end; and installing tubing from said pressure adapter to an existing consumer pipe using appropriate fasteners.

2. An above ground meter box comprising:

a housing having an outer surface with upwardly convergent side walls, an open top and a bottom;

a removable housing cap placed over the open top of said housing;

an adapter pipe;

a meter;

a meter valve;

an annular ring;

interconnecting tubing for interconnecting the adapter pipe, the meter the meter valve and the annular ring inside of said housing; and a plurality of openings disposed through the outer surface of said housing, wherein at least two of said openings are located on the bottom of said housing to receive said adapter pipe and said interconnecting tubing.

3. The above ground meter box according to claim 2, wherein at least one of said plurality of openings is configured to receive said meter.

4. The above ground meter box according to claim 2, wherein at least one of said plurality of openings is configured to receive a faucet.

5. The above ground meter box according to claim 2, wherein said adapter pipe is connected to an outside water source at a first end and said meter valve at a second end.

6. The above ground meter box according to claim 5, wherein said meter valve is attached to said adapter pipe at a first end and attached to said meter at a second end.

7. The above ground meter box according to claim 6, wherein said meter is located in said first of said plurality of openings, there further being a grommet, said meter secured by said grommet.

8. The above ground meter box according to claim 7, wherein said meter is attached to said meter valve at a first end and attached to said interconnecting tubing at a second end.

9. The above ground meter box according to claim 8, wherein said interconnecting tubing is configured to receive an existing consumer pipe.

10. The above ground meter box according to claim 9, wherein said adapter pipe and said interconnecting tubing are made from materials selected from the group consisting of copper, polyethylene, brass and PVC.

11. The above ground meter box according to claim 10, further comprising insulation filling said housing.

12. The above ground meter box according to claim 11, wherein said insulation is selected from the group consisting of vermiculite and cellulose.

13. The above ground meter box according to claim 12, wherein said verimiculite is free flowing.

14. The above ground meter box according to claim 13, wherein said removable housing cap is filled with foam rubber.

15. The above ground meter box according to claim 14, wherein said annular ring is dimensioned and configured to be located beneath the ground.

16. The above ground meter box according to claim 15, wherein said annular ring is secured to said housing by a plurality of support brackets.

* * * * *